(12) United States Patent
Thomas et al.

(10) Patent No.: US 7,260,506 B2
(45) Date of Patent: Aug. 21, 2007

(54) ORTHOGONALIZATION AND DIRECTIONAL FILTERING

(75) Inventors: John K. Thomas, Erie, CO (US); Anand P. Narayan, Boulder, CO (US); Eric B. Olson, Milwaukee, WI (US)

(73) Assignee: Tensorcomm, Inc., Westminster, CO (US)

(*) Notice: Subject to any disclaimer, the term of this patent is extended or adjusted under 35 U.S.C. 154(b) by 0 days.

(21) Appl. No.: 10/959,618

(22) Filed: Oct. 6, 2004

(65) Prior Publication Data

US 2005/0075845 A1 Apr. 7, 2005

Related U.S. Application Data

(63) Continuation-in-part of application No. 09/988,219, filed on Nov. 19, 2001, now Pat. No. 6,856,945.

(51) Int. Cl.
*H04B 1/10* (2006.01)
(52) U.S. Cl. ............... 702/189; 702/190; 702/131; 702/193; 702/194; 702/195; 702/196; 375/148; 375/144; 375/346
(58) Field of Classification Search ............... 702/189, 702/190, 131, 193, 194, 195, 196; 375/148, 375/144, 346
See application file for complete search history.

(56) References Cited

U.S. PATENT DOCUMENTS

| | | |
|---|---|---|
| 3,742,201 A | 6/1973 | Groginsky |
| 4,088,955 A | 5/1978 | Baghdady |
| 4,309,769 A | 1/1982 | Taylor, Jr. |
| 4,359,738 A | 11/1982 | Lewis |
| 4,601,046 A | 7/1986 | Halpern |
| 4,665,401 A | 5/1987 | Garrard et al. |

(Continued)

FOREIGN PATENT DOCUMENTS

DE 4201439 A1 7/1993

(Continued)

OTHER PUBLICATIONS

Mitra, et al., Adaptive Decorrelating Detectors for CDMA Systems, Accepted for Wireless Communications Journal, Accepted May 1995.

(Continued)

*Primary Examiner*—Carol S. W. Tsai
(74) *Attorney, Agent, or Firm*—Anand P. Narayan

(57) ABSTRACT

Systems and methods are provided for directionally filtering signals by projecting a received signal onto a subspace substantially orthogonal to selected interfering signals. The received signal typically comprises at least one signal of interest, at least one selected interfering signal, and noise. The received signal may further comprise other signals, including non-selected interfering signals. The projection of the received signal results in substantially no contribution from the selected interference signals on the signal of interest. For example, substantially no residual energy of the selected interference signals remains as an influence on the signal of interest. In one embodiment, a system generates a converted matrix having a substantially orthogonal set of vectors. Each vector may represent one or more selected interfering signals. The vectors may comprise code characteristics of the selected interfering signals. A directional filter uses the matrix to perform the projection. As such, the filter may be configured to selectively "filter out" the interfering signals by suppressing the effects of the signals based on their code characteristics.

62 Claims, 7 Drawing Sheets

U.S. PATENT DOCUMENTS

| | | |
|---|---|---|
| 4,670,885 A | 6/1987 | Parl et al. |
| 4,713,794 A | 12/1987 | Byington et al. |
| 4,780,885 A | 10/1988 | Paul et al. |
| 4,856,025 A | 8/1989 | Takai |
| 4,893,316 A | 1/1990 | Janc et al. |
| 4,922,506 A | 5/1990 | McCallister et al. |
| 4,933,639 A | 6/1990 | Barker |
| 4,965,732 A | 10/1990 | Roy, III et al. |
| 5,017,929 A | 5/1991 | Tsuda |
| 5,099,493 A | 3/1992 | Zeger et al. |
| 5,105,435 A | 4/1992 | Stilwell |
| 5,109,390 A | 4/1992 | Gilhousen et al. |
| 5,119,401 A | 6/1992 | Tsujimoto |
| 5,136,296 A | 8/1992 | Roettger et al. |
| 5,151,919 A | 9/1992 | Dent |
| 5,218,359 A | 6/1993 | Minamisono |
| 5,218,619 A | 6/1993 | Dent |
| 5,220,687 A | 6/1993 | Ichikawa et al. |
| 5,224,122 A | 6/1993 | Bruckert |
| 5,237,586 A | 8/1993 | Bottomley |
| 5,263,191 A | 11/1993 | Dickerson |
| 5,280,472 A | 1/1994 | Gilhousen et al. |
| 5,305,349 A | 4/1994 | Dent |
| 5,325,394 A | 6/1994 | Bruckert |
| 5,343,493 A | 8/1994 | Karimullah |
| 5,343,496 A | 8/1994 | Honig et al. |
| 5,347,535 A | 9/1994 | Karasawa et al. |
| 5,353,302 A | 10/1994 | Bi |
| 5,377,183 A | 12/1994 | Dent |
| 5,386,202 A | 1/1995 | Cochran et al. |
| 5,390,207 A | 2/1995 | Fenton et al. |
| 5,394,110 A | 2/1995 | Mizoguchi |
| 5,396,256 A | 3/1995 | Chiba et al. |
| 5,437,055 A | 7/1995 | Wheatley, III |
| 5,440,265 A | 8/1995 | Cochran et al. |
| 5,448,600 A | 9/1995 | Lucas |
| 5,481,570 A | 1/1996 | Winters |
| 5,506,865 A | 4/1996 | Weaver, Jr. |
| 5,513,176 A | 4/1996 | Dean et al. |
| 5,533,011 A | 7/1996 | Dean et al. |
| 5,553,098 A | 9/1996 | Cochran et al. |
| 5,602,833 A | 2/1997 | Zehavi |
| 5,644,592 A | 7/1997 | Divsalar |
| 5,736,964 A | 4/1998 | Ghosh et al. |
| 5,787,130 A | 7/1998 | Kotzin et al. |
| 5,844,521 A | 12/1998 | Stephens et al. |
| 5,859,613 A | 1/1999 | Otto |
| 5,872,540 A | 2/1999 | Casabona |
| 5,872,776 A | 2/1999 | Yang |
| 5,894,500 A | 4/1999 | Bruckert et al. |
| 5,926,761 A | 7/1999 | Reed et al. |
| 5,930,229 A | 7/1999 | Yoshida et al. |
| 5,953,369 A | 9/1999 | Suzuki |
| 5,978,413 A | 11/1999 | Bender |
| 5,995,499 A | 11/1999 | Hottinen et al. |
| 6,002,727 A | 12/1999 | Uesugi |
| 6,014,373 A | 1/2000 | Schilling et al. |
| 6,018,317 A | 1/2000 | Dogan et al. |
| 6,032,056 A | 2/2000 | Reudink |
| 6,088,383 A | 7/2000 | Suzuki et al. |
| 6,101,385 A | 8/2000 | Monte et al. |
| 6,104,712 A | 8/2000 | Robert et al. |
| 6,115,409 A | 9/2000 | Upadhyay et al. |
| 6,127,973 A | 10/2000 | Choi et al. |
| 6,131,013 A | 10/2000 | Bergstrom et al. |
| 6,137,788 A | 10/2000 | Sawahashi et al. |
| 6,141,332 A | 10/2000 | Lavean |
| 6,154,443 A | 11/2000 | Huang et al. |
| 6,157,685 A | 12/2000 | Tanaka et al. |
| 6,157,842 A | 12/2000 | Kaisson et al. |
| 6,157,847 A | 12/2000 | Buehrer et al. |
| 6,163,696 A | 12/2000 | Bi et al. |
| 6,166,690 A | 12/2000 | Lin et al. |
| 6,172,969 B1 | 1/2001 | Kawakami et al. |
| 6,175,587 B1 | 1/2001 | Madhow et al. |
| 6,192,067 B1 | 2/2001 | Toda et al. |
| 6,201,799 B1 | 3/2001 | Huang et al. |
| 6,215,812 B1 | 4/2001 | Young et al. |
| 6,219,376 B1 | 4/2001 | Zhodzishsky et al. |
| 6,222,828 B1 | 4/2001 | Ohlson et al. |
| 6,230,180 B1 | 5/2001 | Mohamed |
| 6,233,229 B1 | 5/2001 | Ranta et al. |
| 6,233,459 B1 | 5/2001 | Sullivan et al. |
| 6,240,124 B1 | 5/2001 | Wiedeman et al. |
| 6,252,535 B1 | 6/2001 | Kober et al. |
| 6,256,336 B1 | 7/2001 | Rademacher et al. |
| 6,259,688 B1 | 7/2001 | Schilling et al. |
| 6,263,208 B1 | 7/2001 | Chang et al. |
| 6,266,529 B1 | 7/2001 | Chheda |
| 6,275,186 B1 | 8/2001 | Kong |
| 6,278,726 B1 | 8/2001 | Mesecher et al. |
| 6,282,231 B1 | 8/2001 | Norman et al. |
| 6,282,233 B1 | 8/2001 | Yoshida |
| 6,285,316 B1 | 9/2001 | Nir et al. |
| 6,285,319 B1 | 9/2001 | Rose |
| 6,285,861 B1 | 9/2001 | Bonaccorso et al. |
| 6,301,289 B1 | 10/2001 | Bejjani et al. |
| 6,304,618 B1 | 10/2001 | Hafeez et al. |
| 6,308,072 B1 | 10/2001 | Labedz et al. |
| 6,310,704 B1 | 10/2001 | Dogan et al. |
| 6,317,453 B1 | 11/2001 | Chang |
| 6,321,090 B1 | 11/2001 | Soliman |
| 6,324,159 B1 | 11/2001 | Mennekens et al. |
| 6,327,471 B1 | 12/2001 | Song |
| 6,330,460 B1 | 12/2001 | Wong et al. |
| 6,333,947 B1 | 12/2001 | van Heeswyk et al. |
| 6,351,235 B1 | 2/2002 | Stilp |
| 6,351,642 B1 | 2/2002 | Corbett et al. |
| 6,359,874 B1 | 3/2002 | Dent |
| 6,362,760 B2 | 3/2002 | Kober et al. |
| 6,363,104 B1 | 3/2002 | Bottomley |
| 6,377,636 B1 | 4/2002 | Paulraj et al. |
| 6,380,879 B2 | 4/2002 | Kober et al. |
| 6,385,264 B1 | 5/2002 | Terasawa |
| 6,396,804 B2 | 5/2002 | Odenwalder |
| 6,404,760 B1 | 6/2002 | Holtzman et al. |
| 6,430,216 B1 | 8/2002 | Kober et al. |
| 6,459,693 B1 | 10/2002 | Park et al. |
| 6,501,788 B1 | 12/2002 | Wang |
| 6,515,980 B1 | 2/2003 | Bottomley |
| 6,570,909 B1 | 5/2003 | Kansakoski |
| 6,574,270 B1 * | 6/2003 | Madkour et al. ........... 375/148 |
| 6,580,771 B2 | 6/2003 | Kenney |
| 6,584,115 B1 | 6/2003 | Suzuki |
| 6,590,888 B1 | 7/2003 | Ohshima |
| 6,680,727 B2 | 1/2004 | Butler |
| 6,798,737 B1 | 9/2004 | Dabak |
| 6,801,565 B1 | 10/2004 | Bottomley |
| 2001/0003443 A1 | 6/2001 | Velazquez et al. |
| 2001/0020912 A1 | 9/2001 | Naruse et al. |
| 2001/0021646 A1 | 9/2001 | Antonucci et al. |
| 2001/0046266 A1 | 11/2001 | Rakib et al. |
| 2002/0001299 A1 | 1/2002 | Petch et al. |
| 2002/0051433 A1 | 5/2002 | Affes et al. |
| 2002/0172173 A1 | 11/2002 | Schilling et al. |
| 2002/0176488 A1 | 11/2002 | Kober et al. |
| 2003/0053526 A1 | 3/2003 | Reznik |
| 2004/0136445 A1 * | 7/2004 | Olson et al. ................ 375/148 |

FOREIGN PATENT DOCUMENTS

| | | |
|---|---|---|
| DE | 4326843 A1 | 2/1995 |
| DE | 4343959 A1 | 6/1995 |
| EP | 0558910 A1 | 1/1993 |

| EP | 0610989 A2 | 1/1994 |
| GB | 2280575 A | 2/1995 |
| JP | 2000-13360 A | 1/2000 |
| WO | WO93/12590 | 6/1995 |

OTHER PUBLICATIONS

Schneider, Optimum Detection of Code Division Multiplexed Signals, IEEE Transactions on Aerospace and Electronic Systems, Jan. 1979, vol. AES-15 No. 1.

Mitra, et al., Adaptive Receiver Algorithms for Near-Far Resistant CDMA, IEEE Transactions of Communications, Apr. 1995.

Lupas, et al. Near-Far Resistance of Multiuser Detectors in Asynchronous Channels, IEEE Transactions on Communications, Apr. 1990, vol. 38, No. 4.

Lupas, et al., Linear Multiuser Detectors for Synchronous Code-Division Multiple-Access Channels, IEEE Transactions on Information Theory, Jan. 1989, vol. 35, No. 1.

Kohno, et al., Cancellation Techniques of Co-Channel Interference in Asynchronous Spread Spectrum Multiple Access Systems, May 1983, vol. J 56-A. No. 5.

Garg, et al., Wireless and Personal Communications Systems, 1996, pp. 79-151, Prentice Hall, Upper Saddle River, NJ, US.

Cheng, et al., Spread-Spectrum Code Acquisition in the Presence of Doppler Shift and Data Modulation, IEEE Transactions on Communications, Feb. 1990, vol. 38, No. 2.

Behrens et al., Parameter Estimation in the Presence of Low Rank Noise, pp. 341-344, Maple Press, 1988.

Best, Phase-Locked Loops—Design, Simulation, and Applications, pp. 251-287, McGraw-Hill, 1999.

Iltis, Multiuser Detection of Quasisynchronous CDMA Signals Using Linear Decorrelators, IEEE Transactions on Communications, Nov. 1996, vol. 44, No. 11.

Rappaport, Wireless Communications—Principles & Practice, 1996, pp. 518-533, Prentice Hall, Upper Saddle River, NJ, US.

Scharf, et al., Matched Subspace Detectors, IEEE Transactions on Signal Processing, Aug. 1994, vol. 42, No. 8.

Price et al., A Communication Technique for Multipath Channels, Proceedings to the IRE, 1958, vol. 46, The Institute of Radio Engineers, New York, NY, US.

Affes et al., Interference Subspace Rejection: A Framework for Multiuser Detection in Wideband CDMA, IEEE Journal on Selected Areas in Communications, Feb. 2002, vol. 20, No. 2.

Schlegel et al., Coded Asynchronous CDMA and Its Efficient Detection, IEEE Transactions on Information Theory, Nov. 1998, vol. 44, No. 7.

Xie et al. , A family of Suboptimum Detectors for Coherent Multiuser Communications, IEEE Journal on Selected Areas in Communications, May 1990, vol. 8, No. 4.

Viterbi, Very Low Rate Convolutional Codes for Maximum Theoretical Performance of Spread Spectrum Multiple-Access Channels, IEEE Journal on Selected Areas in Communications, May 1990, vol. 8, No. 4.

Viterbi, CDMA—Principles of Spread Spectrum Communication, 1995, pp. 11-75 and 179-233, Addison-Wesley, Reading, MA, US.

Verdu, Mimimum Probability of Error for Asynchronous Gaussian Multiple-Access Channels, IEEE Transactions on Information Theory, Jan. 1986, vol. IT-32, No. 1.

Kaplan, Understanding GPS—Principles and Applications, 1996, pp. 83-236, Artech House, Norwood, MA, US.

Scharf, Statistical Signal Processing—Detection, Estimation, and Time Series Analysis, 1990, pp. 23-75 and 103-178, Addison-Wesly, Reading, MA US.

Stimson, Introduction to Airborne Radar 2nd edition, 1998, pp. 163-176 and 473-491, SciTech Publishing, Mendham, NJ, US.

Behrens et al. Signal Processing Applications of Oblique Projection Operators, IEEE Transactions on Signal Processing, Jun. 1994, vol. 42, No. 6.

Alexander et al., A Linear Receiver for Coded Multiuser CDMA, IEEE Transactions on Communications, May 1997, vol. 45, No. 5.

Schlegel et al., Multiuser Projection Receivers, IEEE Journal on Selected Areas in Communications, Oct. 1996, vol. 14, No. 8.

Halper et al., Digital-to-Analog Coversio n by Pulse-Count Modulation Methods, IEEE Transactions on Instrumentation and Measurement , Aug. 1996, vol. 45, No. 4.

Ortega et al., Analog to Digital and Digital to Analog Conversion Based on Stochastic Logic, IEEE 0-7803-3026-9/95, 1995.

Frankel et al., High-performance photonic analogue converter, Electronic Letters, Dec. 4, 1997, vol. 33, No. 25.

Lin et al., Digital Filters for High Performance Audio Delta-sigma Analog-to-digital and Digital-to-analog Conversions, Proceedings of ICSP, Crystal Semiconductor Corporation, 1996, Austin, TX, US.

Thomas, Thesis for the Doctor of Philosophy Degree, UMI Dissertation Services, Jun. 1996, Ann Arbor, MI, US.

Schlegel et al., Projection Receiver: A New Efficient Multi-User Detector, IEEE, 1995, 0-7803-2509-5/95.

Behrens, Subspace Signal Processing in Structured Noise, UMI Dissertation Services, Jun. 1990, Ann Arbor, MI, US.

* cited by examiner $$U^TU = \begin{bmatrix} u_1^T u_1 & 0 & \cdots & & 0 \\ 0 & u_2^T u_2 & & & \\ \vdots & & \ddots & & \vdots \\ & & & & 0 \\ 0 & \cdots & & 0 & u_n^T u_n \end{bmatrix}$$

Figure 3a $$(U^TU)^{-1} = \begin{bmatrix} 1/\sigma_1 & 0 & \cdots & & 0 \\ 0 & 1/\sigma_2 & & & \\ \vdots & & \ddots & & \vdots \\ & & & & 0 \\ 0 & \cdots & & 0 & 1/\sigma_n \end{bmatrix}$$

Figure 3b

ORTHOGONALIZATION AND DIRECTIONAL FILTERING

CROSS REFERENCE TO RELATED APPLICATIONS

This application is a continuation-in-part of commonly owned and U.S. patent application Ser. No. 09/988,219 (filed Nov. 19, 2001 now U.S. Pat. No. 6,856,945; the "219 application"), which is hereby incorporated by reference.

BACKGROUND

1. Field of the invention

The invention generally relates to the field of signal processing. More specifically the invention is related to efficient mathematical projection of signals for the purpose of signal filtering.

2. Discussion of the Related Art

Signal processing is the process of altering the characteristics of a signal in a desired way or deriving desired parameters from a signal. It is often used in the recovery of transmitted signals. While various forms of analog and digital signal processing exist, digital signal processing has become increasingly popular due to advances in digital processor technologies and the relative ease in operating with quantized representations of signals. Digital signal filtering, in particular, provides a means to mitigate the effects of undesired signals (e.g., noise and/or interference) to more accurately recover a signal.

Digital signal filtering has long been used to separate desired components of a digital signal from undesired signal components. For example, a digital filter may be used to allow frequency components of a desired signal to pass while substantially blocking the frequency components of an undesired signal. In order to efficiently utilize time and frequency in a communication system, multiple access schemes are used to specify how multiple users or multiple signals may share a specified time and frequency allocation. Spread spectrum techniques may be used to allow multiple users and/or signals to share the same frequency band and time simultaneously. Code division multiple access ("CDMA") is an example of spread spectrum that assigns a unique code to differentiate each signal and/or user. The codes are typically designed to have minimal cross-correlation to mitigate interference. However, even with a small cross-correlation between codes, CDMA is an interference-limited system. Digital signal filters that only pass or block selected frequency bands of a signal to filter out unwanted frequency bands are not applicable since CDMA signals share the same frequency band.

Examples of CDMA communication system include global positioning systems ("GPS") and CDMA wireless telephony. The multiple access coding schemes specified by standards thereby provide "channelization," or channel separability, for the system. In a typical CDMA wireless telephony system, a transmitter may transmit a plurality of signals in the same frequency band by using a combination of spreading codes and/or covering codes. For example, each transmitter may be identified by a unique spreading code or spreading code offset. Moreover, a single transmitter may transmit a plurality of signals sharing the same spreading code, but may distinguish between signals with a unique covering code. Covering codes further encode the signal and provide channelization of the signal. Spreading codes and covering codes are known to those skilled in the art.

While certain signaling implementations such as the coding schemes of CDMA have been useful in efficiently utilizing a given frequency band, these coded signals may still interfere with one another. For example, coded signals may interfere due to similarities in codes and associated signal energy. Lack of orthogonality between these signals results in "leakage" from one signal into another. Examples of this leakage include "co-channel" and "cross-channel" interference. Co-channel interference may include multipath interference from the same transmitter, wherein a transmitted signal takes unique paths that causes one path (e.g., an interfering signal path) and another path (e.g., a selected signal path) to differentially arrive at a receiver, thereby hindering reception of the selected signal path. Cross-channel interference may include interference caused by signal paths of other transmitters hindering the reception of the selected signal path.

Interference can degrade communications because interference may cause a receiver to incorrectly recover transmitted data. Interference may also have other deleterious effects on communications. For example, interference may diminish capacity of a communication system, decrease the region of coverage and/or decrease maximum data rates. For these reasons, a reduction in interference may improve signal processing of selected signals while addressing the aforementioned limitations due to interference.

Certain types of projection techniques have been developed which project a received signal onto a subspace orthogonal to a Signal Of Interest ("SOI") lies. The signal may be decomposed into a component that lies in the subspace containing the interference and an orthogonal subspace. This projection operation determines the amount of the signal that lies in the direction of the SOI. However, residual energy of the interfering components may lie in the direction of the SOI since the interfering signal and the SOI may not be orthogonal. This residual energy may degrade the recovery of the SOI. Projective methods for interference cancellation of a plurality of signals may include a matrix inverse containing non-independent vectors. In software and hardware implementations, a full matrix inverse may be computationally expensive.

SUMMARY

The systems and methods described and illustrated herein provide for directional filtering of signals by projecting a coded representation of a received signal onto a subspace orthogonal to a signal selected for removal. The received signal comprises the selected signal as well as other signals and noise. A subset of the other signals may be selected for removal. The projection of the received signal results in a reduction of the contributions from the other signals on the selected signal. As such, a reduced amount of residual energy of the other signals in the direction of the SOI remains as an influence on the selected signal.

In one embodiment of the invention, a system generates a matrix having a substantially orthogonal set of vectors. Each vector represents one or more signals. A directional filter uses the matrix to project the received signal onto a subspace orthogonal to a subset of the other signals. For example, the system may generate a projection operator from the matrix, which, when applied to a received signal, substantially cancels the selected interfering signals by projecting the received signal onto a subspace that is orthogonal to the subspace comprising the signals selected for removal. In one embodiment, the vectors comprise code elements of selected signals as inputs to the vectors. As such, the directional filter may be configured to selectively "filter out" signals by suppressing the contributions of the signals (i.e., based on the characteristics of their codes) to the SOI.

The embodiments shown and described herein may be particularly advantageous to systems employing CDMA communications because of CDMA's use of codes to differentiate transmitters and/or channels. However, the invention is not intended to be limited to such systems as other coded signals may enjoy similar advantages.

BRIEF DESCRIPTION OF THE DRAWINGS

FIGS. 3a and 3b illustrate exemplary orthogonal matrix operations in one embodiment of the invention.

DETAILED DESCRIPTION OF THE DRAWINGS

Figure 1A:
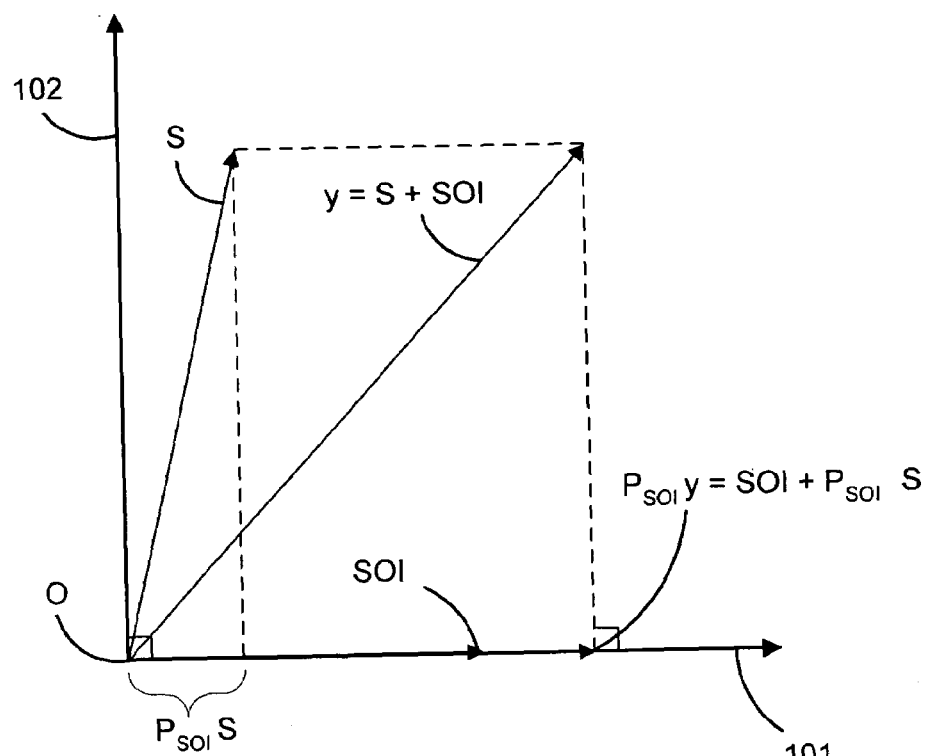
FIG. 1a illustrates an exemplary prior art projection.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the spirit and scope of the invention as defined by the claims.

FIG. 1a illustrates an exemplary prior art projection. CDMA signals may be represented as a vector in a code vector space in which components of each signal are specified by their spreading code, covering code, amplitude, sign and/or phase. For example, a code vector of length N lies in an N-dimensional space. As shown in this figure, a signal S and an SOI (i.e., lying along axis 101) are represented as vectors of varying magnitudes originating from an origin O within the graph defined by orthogonal axes 101 and 102. In this example, the vectors S and the SOI are not orthogonal vectors and have a non-zero cross-correlation. A received signal y typically comprises a plurality of signals and noise. However, for the purposes of this example, the received signal y is illustrated as comprising the signal S and the SOI. The received signal y is thus represented as a vector summation of the S vector and the SOI vector (i.e., y=S+SOI).

A projection of the signal S (labeled as $P_{SOI}S$) onto the subspace 101 comprising the SOI shows an amount of energy that the signal S directs along axis 101. A projection of the received signal onto the subspace comprising the SOI (labeled as $P_{SOI}y$=SOI+$P_{SOI}S$) contains the amount of energy that the signal S contributes in the direction of the SOI. This contribution to the SOI by the signal S may interfere with the recovery of the SOI.

Figure 1B:
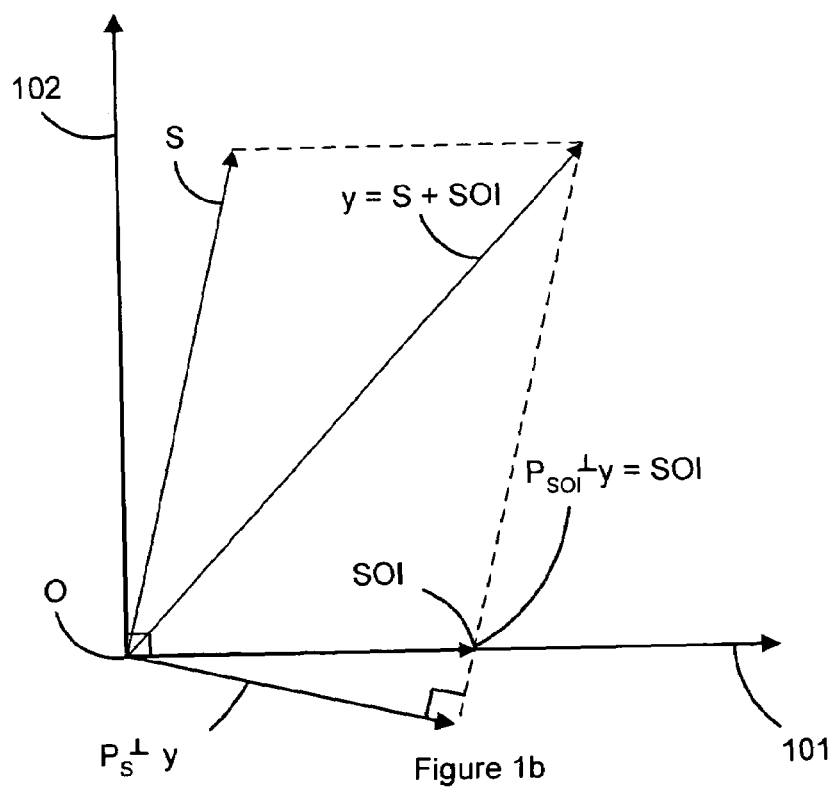
FIG. 1b illustrates a projection in one embodiment of the invention.

FIG. 1b illustrates a projection in one embodiment of the invention. As in FIG. 1a, the signal S and the SOI (again lying along axis 101) are represented as vectors of varying magnitudes originating from an origin O within the graph defined by orthogonal axes 101 and 102. The received signal y is a vector sum of the S vector and the SOI vector. Differing from the prior art example, however, the received signal y is projected in a direction substantially orthogonal to the signal S onto a subspace substantially orthogonal to a subspace comprising S. A correlation of the orthogonal projection of y and a reference vector in the direction of the SOI thereby substantially eliminates the contribution of the signal S to the SOI. The projection, in this embodiment, therefore results in recovering a substantial portion of the SOI without the interfering effects of the signal S.

Although illustrated with respect to a single interfering signal (i.e., signal S), those skilled in the art should readily recognize that the embodiment is only exemplary in nature. A received signal may and typically S comprises more than one interfering signal and noise. Accordingly, the invention is not intended to be limited by the embodiment shown and described herein. Rather, the invention should only be limited to the language recited in the claims and their equivalents.

Figure 2:
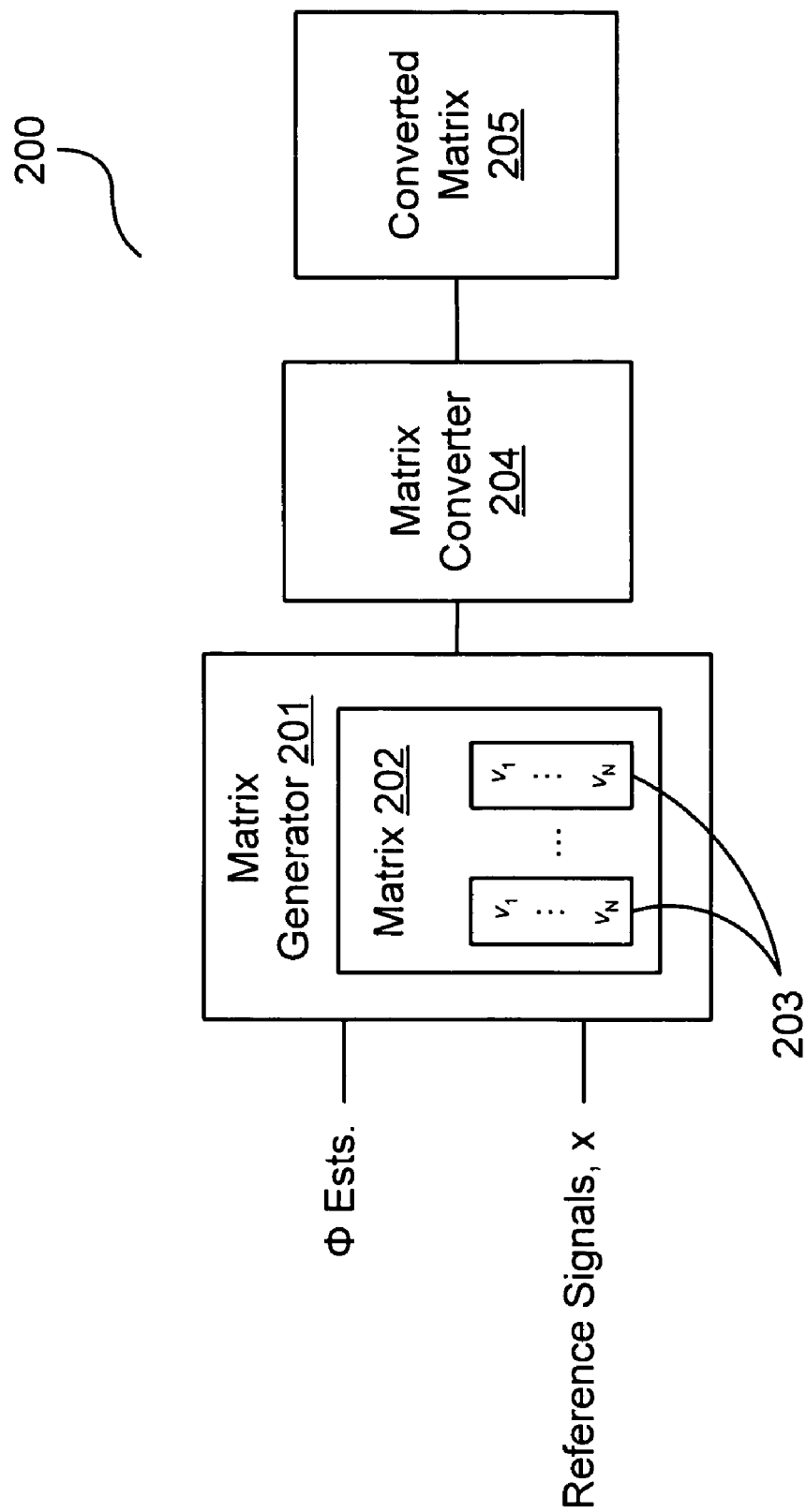
FIG. 2 is a block diagram of a system in one embodiment of the invention.

FIG. 2 is a block diagram of system 200 in one embodiment of the invention. In this embodiment, system 200 is configured for computing a portion of a cancellation operator that is used to substantially remove interfering signals from a received signal to improve the processing and recovery of an SOI. System 200, therefore, in essence directionally filters the SOI in code space to diminish the interfering effects of the signals.

System 200 comprises matrix generator 201 and matrix converter 204. Matrix generator 201 is configured for generating a matrix 202 having a plurality of vectors 203. Each vector 203 of matrix 202 comprises elements from one or more signals. The indices denote samples, or chips of the vectors, in time. In one embodiment, the signals are interfering signals that hinder the recovery of the SOI in a CDMA communication system. Matrix converter 204 is communicatively coupled to matrix generator 201 and is configured for generating a substantially orthogonal set of vectors from the vectors 203 of matrix 202 and thus generating a converted matrix comprising a set of vectors that form an orthogonal basis. Matrix converter 204 is also configured for computing a portion of the cancellation operator from a converted matrix 202. An orthogonal basis is known to those skilled in the art.

In one embodiment of the invention, the cancellation operator may be a projection operator that substantially conforms to the following equation where the S matrix is comprised of column vectors s:

$$P_s^\perp = I - S(S^T S)^{-1} S^T, \quad (\text{Eq. 1})$$

wherein $P_s^\perp$ is an orthogonal projection operator, I is an identity matrix and S is the matrix 202 of signals selected for removal. Matrix converter 204 is configured for essentially computing the $(S^T S)^{-1}$ term without performing a full matrix inversion.

In this embodiment, computations are performed upon matrix 202 which simplify the computations for generating the projection operator. For example, certain computations performed upon a generated S matrix 202 can lead to a substantially equivalent S matrix that simplifies calculations of the $(S^T S)^{-1}$ term. These computations include an "orthogonalization" of the set of vectors that comprise the S matrix 202.

The vectors 203 of the matrix 202 are not generally orthogonal to one another. Matrix converter 204 "orthogonalizes" the set of vectors comprising matrix 204 via a conversion to a substantially equivalent orthogonal set of vectors. This orthogonalization of the vectors 203 essentially creates a converted matrix 205 with vectors that form an orthogonal basis. An orthogonal basis is known to those skilled in the art. Benefits of such orthogonalization is described in greater detail in FIGS. 3a and 3b.

It should be noted that some prior art methods produce an orthonormal basis, which involves a normalization of the orthogonal set of vectors. This orthonormalization includes a scaling of vectors (i.e., scaled to a unit length). However, such methods are not necessary in the context of directional filtering because the magnitude is not necessary in determining the subspace of the matrix S selected for removal.

FIGS. 3a and 3b illustrate exemplary orthogonal matrix operations in one embodiment of the invention. First, a matrix S (e.g., matrix 202 as generated by matrix 201, both of FIG. 2) may be represented by the following:

$$S=[s_1:s_2: \ldots :s_n],\quad\quad\quad\quad (\text{Eq. 2})$$

wherein $s_1, \ldots, s_n$ are column vectors of the matrix, such as vectors 203 of FIG. 2, and wherein n is an integer equal to the number of vectors s populating the matrix. To orthogonalize a set of vectors, a matrix converter, such as matrix converter 204 of FIG. 2, associates a subset of vectors s in a matrix S with orthogonal vectors u that may be used in orthogonal projection calculations. For example, with $s_1$ equivalent to $u_1$ the matrix converter may project the vector $s_2$ onto a subspace that is substantially orthogonal to the $u_1$ vector to form $u_2$; subsequently the matrix converter may project the vector $s_3$ onto a subspace that is substantially orthogonal to the subspace spanned by the $u_1$ and $u_2$ vectors to form $u_3$; et cetera. As such, the $u_1, \ldots, u_j$ vectors form an orthogonal basis set.

Orthogonalization of the set of vectors s may therefore be computed as follows:

$$u_1 = s_1 \quad\quad\quad\quad (\text{Eq. 3a})$$

$$u_2 = s_2 - P_{u_1}^\perp s_2 \quad\quad\quad\quad (\text{Eq. 3b})$$

$$u_3 = s_3 - P_{u_1}^\perp s_3 - P_{u_2}^\perp s_3, \quad\quad\quad\quad (\text{Eq. 3c})$$

wherein the u vectors are orthogonal vectors. This orthogonalization computation is performed for all vectors $s_1, \ldots, s_n$ of the matrix S. Based on the structure of the orthogonalization, vector $s_n$ in the matrix S may be computed as follows:

$$u_n = s_n - P_{u_1}^\perp s_n - \ldots - P_{u_{n-1}}^\perp s_n \quad\quad\quad\quad (\text{Eq. 3d})$$

An equivalent and more compact form of equation Eq. 3d is given as follows:

$$u_n = s_n - \sum_{j=1}^{n-1} P_{u_j}^\perp s_n \quad\quad\quad\quad (\text{Eq. 4})$$

The orthogonalization computation can therefore be equivalently written as:

$$u_1 = s_1 \quad\quad\quad\quad (\text{Eq. 4a})$$

$$u_2 = s_2 - u_1(u_1^T \cdot u_1)^{-1} u_1^T s_2 \quad\quad\quad\quad (\text{Eq. 4b})$$

$$u_3 = s_3 - u_1(u_1^T \cdot u_1)^{-1} u_1^T s_3 - u_2(u_2^T \cdot u_2)^{-1} u_2^T s_3. \quad\quad\quad\quad (\text{Eq. 4c})$$

$$u_n = s_n - u_1(u_1^T \cdot u_1)^{-1} u_1^T s_n - \ldots - u_{j-1}(u_{n-1}^T \cdot u_{n-1})^{-1} u_{n-1}^T s_n, \quad\quad\quad\quad (\text{Eq. 4d})$$

Similarly, an equivalent and more compact form of equation Eq. 4d is given as follows:

$$u_n = s_n - \sum_{j=1}^{n-1} u_j(u_j^T u_j)^{-1} u_j^T s_n. \quad\quad\quad\quad (\text{Eq. 5})$$

The term $(u_j^T u_j)^{-1}$ of Eq. 5 can be reused for all subsequent u vector orthogonalization computations with an index greater than j for a particular vector y. For example, it is readily observable that the term $(u_1^T \cdot u_1)^{-1}$ is used in each of equations Eq. 4b and Eq. 4c. Accordingly, as more vectors s populate the interference matrix S, more of the terms $(u_j^T u_j)^{-1}$ can be reused. For the jth u vector (j−1) of the $(u^T u)^{-1}$ terms may be re-used.

Once the vectors s of the matrix S have been orthogonalized with the substantially equivalent orthogonal set of vectors u, the matrix S can be represented by the matrix U comprised of orthogonalized u vectors as follows:

$$U=[u_1:u_2: \ldots :u_n]. \quad\quad\quad\quad (\text{Eq. 6})$$

The projection operator of Eq. 1 may therefore be represented as $$P_U^\perp = I - U(U^T U)^{-1} U^T, \quad\quad\quad\quad (\text{Eq. 7})$$

wherein $P_U^\perp$ is the projection operator constructed from the matrix U.

Orthogonal vectors have zero cross-correlation. Since the vectors s have been converted to a set of substantially orthogonal u vectors, the correlation of any two vectors in the set will be negligible, as is known to those skilled in the art. The computation of the $U^T U$ term of Eq. 7 therefore produces a substantially diagonal matrix illustrated in FIG. 3a. Once the diagonal matrix of FIG. 3a is computed, an inversion of the resulting term is performed by inverting the scalars along the diagonal. For example, with the $(u_j^T u_j)$ terms denoted as $\sigma_j$ for simplicity, the inverse of the $U^T U$ term comprises the inverse of the σ terms (i.e., $1/\sigma_j$) along the diagonal and substantially zero terms elsewhere as illustrated in FIG. 3b. Computational performance of the projection operator improves because calculation of a full matrix inverse is not required and the number of operations is significantly reduced.

In comparison, prior art orthonormalization methods utilize a computationally expensive square root calculation in the normalization procedure. For example, when a vector s is normalized, the magnitude of that vector is typically computed according to the well-known Euclidean norm, which employs a square root computation. The orthogonalization of the present invention does not employ such normalization of vectors and eliminates the need for square root computations.

While one exemplary preferred embodiment has been shown and described herein, the invention is not to be limited to the preferred embodiment. Additionally, those skilled in the art should readily recognize that the operations described herein may be implemented in a variety of ways. For example, a matrix converter that performs the orthogonalization process described herein may be implemented in hardware, software, firmware or various combinations thereof. Moreover, the matrix generator may also be implemented in hardware, software, firmware or various combinations thereof. Examples of such hardware may include Application Specific Integrated Circuits ("ASIC"), Field Programmable Gate Arrays ("FPGA"), general-purpose processors, Digital Signal Processors ("DSPs"), and/or other circuitry. Examples of software and firmware include Java, C, C++, Matlab, Verilog, VHDL and/or processor specific machine and assembly languages. Accordingly, the invention should only be limited by the language recited in the claims and their equivalents.

Computer programs (i.e., software and/or firmware) implementing the method of this invention will commonly be distributed to users on a distribution medium such as a SIM card, a USB memory interface, or other computer-readable memory adapted for interfacing with a consumer wireless terminal. Similarly, computer programs may be distributed to users via wired or wireless network interfaces. From there, they will often be copied to a hard disk or a similar intermediate storage medium. When the programs are to be run, they will be loaded either from their distribution medium or their intermediate storage medium into the execution memory of the wireless terminal, configuring an onboard digital computer system (e.g. a microprocessor) to act in accordance with the method of this invention. All these operations are well known to those skilled in the art of computer systems.

The term "computer-readable medium" encompasses distribution media, intermediate storage media, execution memory of a computer, and any other medium or device capable of storing for later reading by a digital computer system a computer program implementing the method of this invention.

Various digital computer system configurations can be employed to perform the method embodiments of this invention, and to the extent that a particular system configuration is capable of performing the method embodiments of this invention, it is equivalent to the representative system embodiments of the invention disclosed herein, and within the scope and spirit of this invention.

Once digital computer systems are programmed to perform particular functions pursuant to instructions from program software that implements the method embodiments of this invention, such digital computer systems in effect become special-purpose computers particular to the method embodiments of this invention. The techniques necessary for this programming are well known to those skilled in the art of computer systems.

Figure 4:
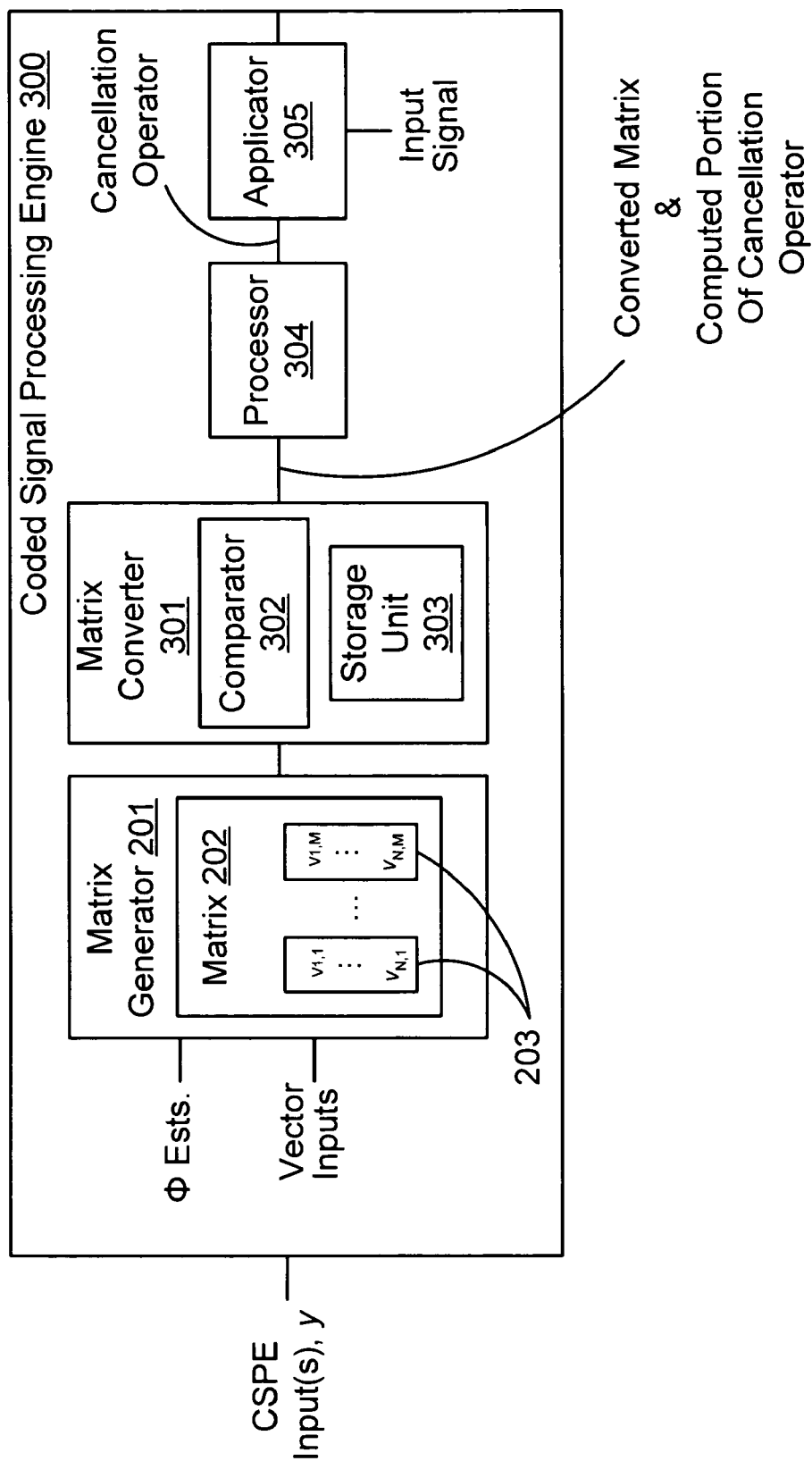
FIG. 4 is a block diagram of an exemplary Coded Signal Processing Engine in one embodiment of the invention.

FIG. 4 is a block diagram of exemplary Coded Signal Processing Engine ("CSPE") 300 in one embodiment of the invention. In this embodiment, CSPE 300 substantially cancels a plurality of interfering signals from a received signal y by applying a cancellation operator via applicator 305 to an input signal. The input signal may be the received signal y, an interference canceled signal (i.e., the received signal y with the interfering signals substantially removed), an on time pseudo noise ("PN") reference code or an interference canceled on time PN reference code. The term, "on time," as used herein refers to a particular timing alignment for a PN code. Such a timing alignment may correspond to code tracking of a selected signal by a processing finger in a receiver.

Application of the cancellation operator to either the received signal y or the interference-canceled signal may result in substantially removing the interfering signals from the input signal. Similarly, the application of the cancellation operator to PN reference codes may result in the substantial removal of the interfering signals.

In this embodiment, CSPE 300 comprises matrix generator 201 of FIG. 2, which is configured for receiving vector inputs such as interfering signals and associated phase estimates for such signals. For example, a selection of interfering signals may be input to matrix generator 201 to generate vectors 203 of matrix 202. Each vector 203 may comprise elements of one or more interferers. These interferers may be interfering signal path and/or channel combinations of CDMA signals. The phase estimates for a given signal path may be imposed on the vectors to provide improved cancellation. Other optional values, such as amplitude and/or sign information of the signals, may be imposed on the vectors as well.

CSPE 300 also comprises matrix converter 301 communicatively coupled to matrix generator 201. Matrix converter 301 is configured for receiving matrix 202 and for converting matrix 202 by generating a substantially orthogonal set of vectors from vectors 203 to form a substantially, directionally equivalent matrix. For example, matrix converter 301 may receive an S matrix of Eq. 2 and convert that matrix into an orthogonal matrix U by orthogonalizing the vectors of the S matrix. From the converted matrix, matrix converter 301 computes a portion of the cancellation operator. More specifically, matrix converter 301 computes the $(U^T U)^{-1}$ matrix term of Eq. 7 to generate the substantially diagonal matrix illustrated in FIG. 3b (i.e., without performing a full matrix inversion of the matrix S).

In this embodiment, matrix converter 301 comprises a storage unit 303 which is configured for storing computed values of $(u_j^T u_j)^{-1}$ which, as described in FIG. 3, may be reused for the generation of subsequent $u_j$'s of the matrix U. Examples of storage unit 303 include memory on: an ASIC, FPGA or DSP; a computer memory; registers; memory units; data structures; storage media (e.g., computer disks) and various combinations thereof. Additionally, matrix converter 301 comprises comparator 302 for enabling computation of the orthogonal matrix U where the matrix S is a "singular" or "ill-conditioned" matrix, as known to those skilled in the art. For example, when two vectors s in a matrix S are substantially dependent, orthogonalization of the set of vectors s into the set of vectors u creates an instance in which one of diagonal terms m in the matrix tends to zero. Inverting such a matrix therefore produces a number that may be unreasonable in terms of calculation. However, it is possible that two or more vectors may be substantially dependent and, as such, create an element $1/\sigma$ that is exceptionally large in the $(U^T U)^{-1}$ computation. Those skilled in the art understand the mathematical implications of dependent vectors.

To compensate for ill-conditioned matrices, comparator 302 compares each of the calculated $\sigma_j$ terms to a predetermined threshold. If a $\sigma_j$ term is below the threshold, the orthogonalization calculation for the particular vector s used to compute the $\sigma_j$ term is discontinued and the vector s is removed from the calculation. This comparison operation may prevent the creation of substantially large terms in the computation of $(U^T U)^{-1}$ and ill-conditioning of the resulting matrix. If, however, a $\sigma_j$ term is above the threshold, the orthogonalization for the vector s used to compute that $\sigma_j$ term is continued and stored with storage unit 303 for potential reuse.

Once the portion of the cancellation operator is computed by matrix converter 301, the computed portion and the matrix U are transferred to processor 304 for the computation of the cancellation operator. For example, with the $(U^T U)^{-1}$ term already computed by matrix converter 301, processor 304 may compute the projection operator $P_U^\perp$ of Eq. 7.

Applicator 305 applies the cancellation operator to the input signal to substantially remove selected components from the input signal. For example, the application of the cancellation operator to the input signal may perform the function of a directional filter in which any signals that lie in the direction of the subspace formed by the plurality of u vectors are substantially filtered out. The computed cancellation operator is used to project a received signal onto a subspace orthogonal to the subspace spanned by the u vectors as described in FIG. 1. Accordingly, the cancellation operator based on projection techniques may selectively "filter out" interfering signals by suppressing the effects of signals that point in the direction of the selected interfering signals. This selective filtering of applicator 305 may therefore provide an interference-canceled signal with the selected interfering signals substantially canceled.

While one exemplary preferred embodiment has been shown in described herein, those skilled in the art should readily recognize that the invention is not intended to be limited to the preferred embodiment. For example, CSPE 300 may comprise a plurality of matrix generator/matrix converter combinations each providing orthogonal matrices and computed portions of cancellation operators to a processor for the generation of a plurality of cancellation operators. Additionally, a plurality of applicators may reside within CSPE 300 each configured for applying a particular cancellation operator to a particular input signal to provide a plurality of interference canceled signals output from CSPE 300.

Those skilled in the art should also readily recognize that the operations described herein may be implemented in a variety of ways. For example, a processor that uses a computed portion of the cancellation operator and the matrix U to generate the cancellation operator and/or the applicator that applies that cancellation operator may be implemented in hardware, software, firmware or various combinations thereof. Examples of such hardware may include Application Specific Integrated Circuits ("ASICs"), Field Programmable Gate Arrays ("FPGAs"), general-purpose processors, Digital Signal Processors ("DSPs"), and/or other circuitry. Examples of software and firmware include Java, C, C++, Matlab, Verilog, VHDL and/or processor specific machine and assembly languages. For at least these reasons, the invention should only be limited by the language recited by the claims and their equivalents.

Figure 5:
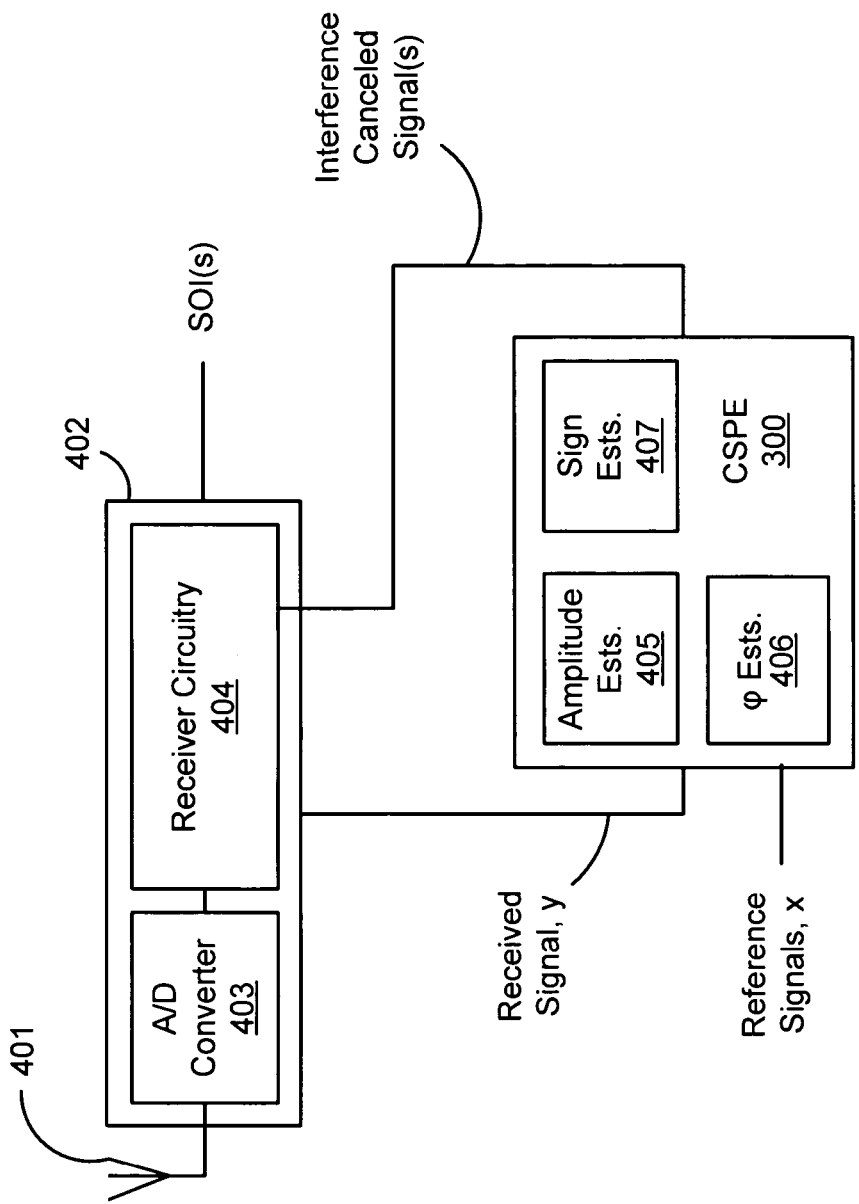
FIG. 5 is a block diagram of the Coded Signal Processing Engine of FIG. 4 configured with a receiver in one exemplary embodiment of the invention.

FIG. 5 is a block diagram of CSPE 300 of FIG. 4 configured with receiver 402 in one exemplary embodiment of the invention. In this embodiment, receiver 402 comprises antenna 401, analog to digital ("A/D") converter 403 and receiver circuitry 404. Antenna 402 is configured for receiving a radio signal that comprises a selected signal and at least one interfering signal. For example, a received radio signal typically comprises a plurality of signals with one of those signals being selected for processing. The remaining signals may be considered interference. A/D converter 403 converts the radio signal to a digital signal so that the selected signal may be digitally processed by receiver circuitry 404.

CSPE 300 is configured for receiving a digital signal and substantially canceling interfering signals from the digital signal. Accordingly, CSPE 300 can be configured with receiver 402 to substantially canceling interfering signals from the digital signal of the receiver. CSPE 300 may either be configured within receiver 402 or externally to receiver 402 for receiving the digital signal. Once received, CSPE 300 may generate a substantially interference canceled signal by applying a cancellation operator, as described herein above, to the digital signal. CSPE 300 may then transfer the signal to receiver circuitry 404 through a communicative coupling such that the receiver circuitry may process the interference-canceled signal (i.e., the selected signal without the substantially degrading effects of the interfering signals). For example, once received from CSPE 300, receiver circuitry 404 may track and demodulate the interference-canceled signal. In one embodiment, receiver circuitry 404 comprises a rake receiver having a plurality of processing fingers. Each processing finger may independently track and demodulate an interference-canceled signal. Rake receivers and processing fingers are known to those skilled in the art.

Figure 6:
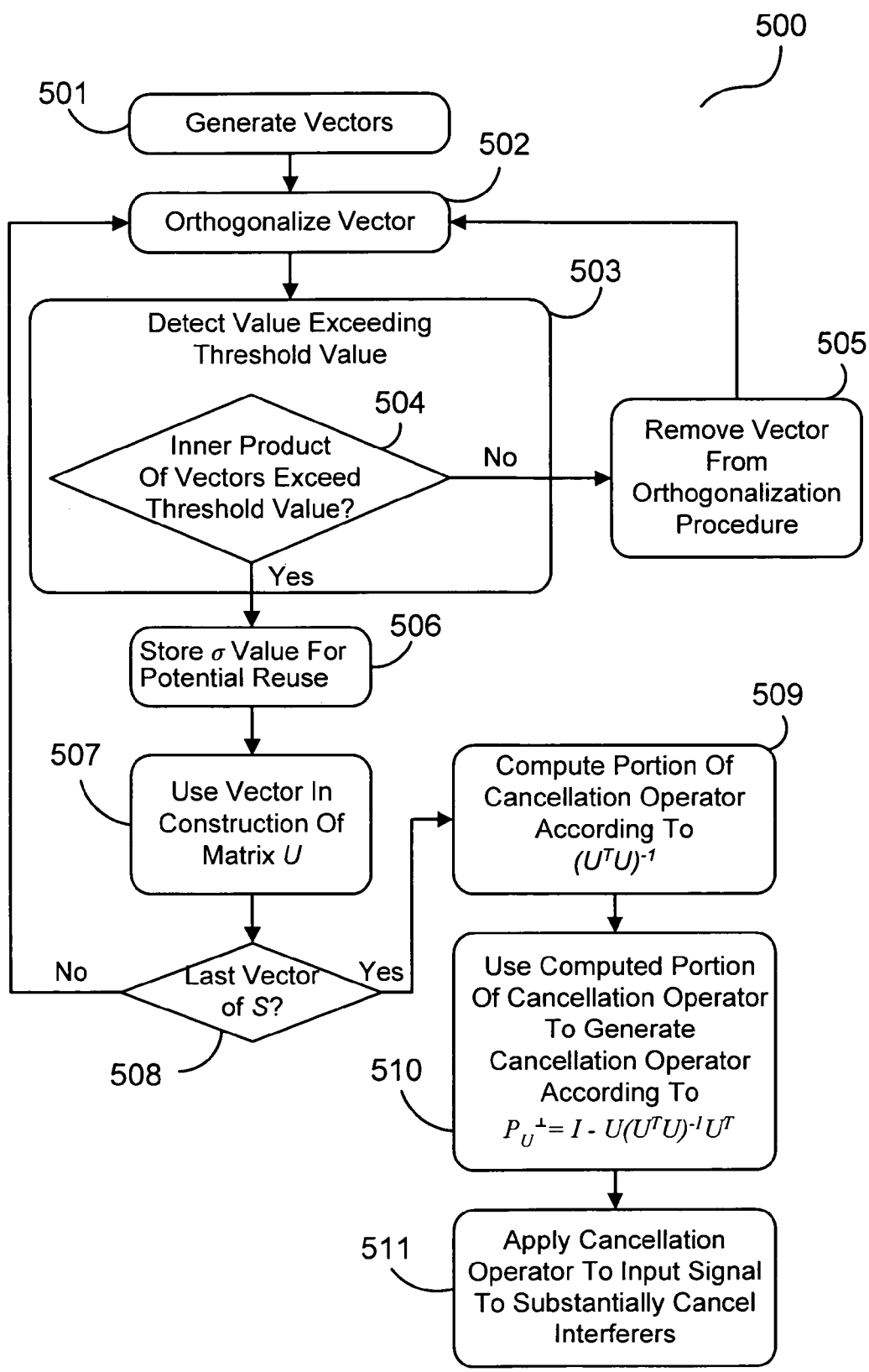
FIG. 6 is a flow chart illustrating one exemplary methodical embodiment of the invention.

FIG. 6 is flow chart 500 illustrating one exemplary methodical embodiment of the invention. In this embodiment, vectors s are generated in element 501. For example, interfering signals may be chosen as vector inputs to a matrix S, such as matrix 202 of FIG. 2. The set of s vectors are then orthogonalized in element 502 to substantially remove contributions that are in the direction of previous vectors and to generate a matrix U comprising orthogonal vectors.

During computation of the orthogonal vectors u, values for uj may be computed and compared to a threshold value in element 503 to detect substantially dependent vectors. As described herein above, the computed values of $\sigma_j$ are $(u_j^T u_j)$. For example, if the inner product of the vector u does not exceed the threshold value in element 504, the corresponding s vector is removed in element 505 from the orthogonalization procedure. The process of flow chart 500 then returns to element 502 to orthogonalize another vector s. If, however, the inner product does exceed the threshold value, the vector s is retained for the computation of the vector u associated with that s vector and the value $\sigma$ is stored for potential reuse, in element 506.

Upon storage of the $\sigma_j$ value in element 506, the vector $u_j$ is used in the construction of the matrix U, in element 507. Once the vector is used, a determination as to whether the s vector of element 501 was the last vector within the matrix S, in element 508. If more vectors s remain, the process returns to element 502 to continue to orthogonalize vectors of the S matrix. If, however, element 508 determines that the s vector was the last vector of the matrix S, orthogonalization of the matrix S to produce the matrix U comprising orthogonal vectors u is complete and a portion of the cancellation operator is correspondingly computed in element 509. The portion of the cancellation operator may be computed according to the $(U^T U)^{-1}$ term as described in FIGS. 3 and 4. Again, this orthogonalization process may compute this $(U^T U)^{-1}$ term without a full inversion of the matrix U.

The portion of the cancellation operator as well as the orthogonal matrix U may be used to compute the remainder of the cancellation operator in element 510. In one embodiment, the cancellation operator is a projection operator generated according to Eq. 5. Once the cancellation operator is computed, it may be applied to an input signal to substantially cancel interfering components of the input signal, in element 511. The input signal may again be a received signal y, an interference canceled y signal, an on time reference code or an interference canceled on time reference code. Accordingly, the cancellation operator may be used to substantially remove interfering signals from the input signal through the application of the cancellation operator to the input signal, as described above herein.

Figure 7:
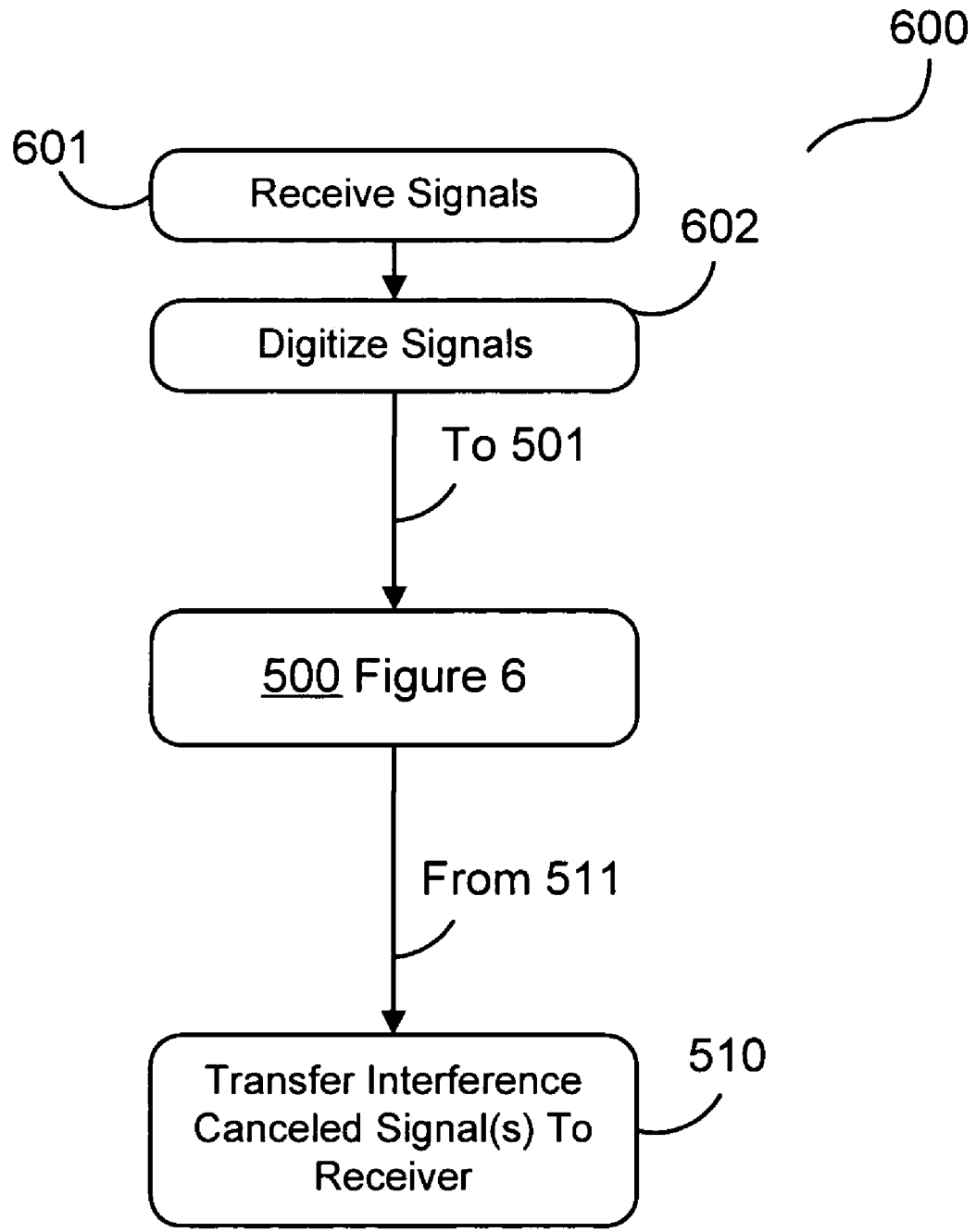
FIG. 7 is a flow chart illustrating another exemplary methodical embodiment of the invention.

FIG. 7 is flow chart 600 illustrating one exemplary methodical embodiment of the invention. In this embodiment, a signal is received and digitized, in elements 601 and 602. For example, receiver 402 of FIG. 5 may be configured to receive a radio signal comprising a signal selected for processing and a plurality of interfering signals. The receiver may convert that radio signal to a digital signal for subsequent digital processing of the selected signal. Once the signal is converted to a digital signal, the signal may be transferred to a CSPE, such as CSPE 300 of FIG. 4.

The CSPE may be configured for performing the method of flowchart 500 of FIG. 6. Accordingly, the CSPE may generate vectors from the digital signal according to element 501 of FIG. 6. Once the CSPE completes flowchart 500 by applying the cancellation operator to an input signal (e.g., the digital signal) in element 511, the CSPE may transfer the resultant interference canceled signal to the receiver for further processing, such as tracking and demodulation of the interference canceled signal. For example, the CSPE may apply the cancellation operator to the digital signal to substantially cancel the interfering signals from the digital signal and thereby generate an interference-canceled signal. This interference canceled signal comprises the signal selected for processing and may be tracked and/or demodulated by the receiver with improved SNR because the degrading effects of the interfering signals have been substantially removed.

The embodiments described herein may substantially reduce interference caused by undesired signals and improve signal processing of the desired signal. For example, poor signal quality due to interference may deleteriously affect recovery of the transmitted signal, (e.g., via the processes of acquisition, tracking and/or demodulation of selected signals). A reduction of interference may, therefore, improve receiver performance and thereby reduce errors. In regards to such benefits, the embodiments herein may advantageously require use within a CDMA communication system (e.g., CDMA telephony systems). Improved processing within a CDMA telephony system may be exploited in terms of increased system capacity, transmit power reduction, system coverage and/or data rates. However, those skilled in the art should readily recognize that the above embodiments should not be limited to any particular type of signaling. For example, the embodiments disclosed herein may be advantageous to systems employing CDMA (e.g., such as cdma-One, cdma2000, 1×RTT, cdma 1×EV-DO, cdma 1×EV-DV and cdma2000 3×), WCDMA, Broadband CDMA, Universal Mobile Telephone System ("UMTS") and/or GPS signals.

Additionally, it should be noted that the above embodiments of the invention may be implemented in a variety of ways. For example, the above embodiments may be implemented in software, firmware, hardware or various combinations thereof. Those skilled in the art are familiar with software, firmware, hardware and their various combinations. To illustrate, those skilled in the art may choose to implement certain aspects of the invention in hardware using ASIC chips, DSPs and/or other circuitry. Still, some aspects of the invention may be implemented through combinations of software using Verilog, VHDL, Java, C, C++, Matlab, and/or processor specific machine and assembly languages. Accordingly, those skilled in the art should readily recognize that such implementations are a matter of design choice and that the invention should not be limited to any particular implementation.

While the invention has been illustrated and described in detail in the drawings and foregoing description, such illustration and description is to be considered as exemplary and not restrictive in character. Accordingly, it should be understood that only the preferred embodiment and minor variants thereof have been shown and described and that all changes and modifications that come within the spirit of the invention are desired to be protected.

What is claimed is:

1. A system configured for processing a received signal comprising a signal of interest and at least one interferer, the system comprising:
 a matrix generator configured for generating a matrix having a plurality of vectors, wherein each of the plurality of vectors comprises elements from the at least one interferer; and
 a matrix converter communicatively coupled to the matrix generator, wherein the matrix converter is configured for generating a substantially orthogonal vector set from the plurality of vectors to convert the matrix for producing a converted matrix and for computing a portion of a cancellation operator from the converted matrix, the cancellation operator configurable for operating on the received signal to produce an interference-cancelled signal having a reduced contribution from the at least one interferer.

2. The system of claim 1, wherein the portion of the cancellation operator computed by the matrix converter comprises the form:

$$(U^T U)^{-1},$$

wherein U is the converted said matrix and $U^T$ is a transpose of the converted said matrix.

3. The system of claim 2, wherein the cancellation operator comprises the form:

$$P_{U^\perp} = I - U(U^T U)^{-1} U^T,$$

wherein $P_{U^\perp}$ is the cancellation operator and I is an identity matrix.

4. The system of claim 1, wherein the matrix converter comprises a comparator configured for selecting at least one of the plurality of vectors having vector-derived values within the portion of the cancellation operator exceeding a threshold value, the matrix converter producing a plurality of selected vectors, wherein the matrix converter is further configured for generating the substantially orthogonal vector set from the plurality of selected vectors.

5. The system of claim 1, wherein the substantially orthogonal vector set is generated according to the form:

$$u_n = s_n - \sum_{j=1}^{n-1} u_j (u_j^T u_j)^{-1} u_j^T s_n,$$

wherein n is an integer greater than 1, s is a vector of the matrix and u is an orthogonalized vector of the converted matrix.

6. The system of claim 5, wherein the matrix generator comprises a storage unit configured for storing computed values of $u_j^T u_j$.

7. The system of claim 5, wherein the computed values of $u_j^T u_j$ are used to generate values of the portion of the cancellation operator according to:

$$\sigma_j = (u_j^T u_j)^{-1},$$

wherein $\sigma_j$ is one of the values of the portion of cancellation operator and wherein the storage unit is further configured for storing computed values of $\sigma_j$.

8. The system of claim 7, wherein the values of $\sigma_j$ are compared to a threshold to determine use of the vectors $u_j$ in construction of the converted matrix.

9. A processing engine adapted for use in a receiver configured for processing a received signal comprising a signal of interest and at least one interferer, the processing engine comprising:
- a matrix generator configured for generating a matrix having a plurality of vectors, wherein each of the plurality of vectors comprises elements from the at least one interferer;
- a matrix converter communicatively coupled to the matrix generator, wherein the matrix converter is configured for generating a substantially orthogonal vector set from the plurality of vectors to generate a converted matrix and for computing a portion of a cancellation operator from the converted matrix; and
- a processor configured for processing the portion of the cancellation operator to generate the cancellation operator, the cancellation operator configurable for operating on the received signal to produce an interference-cancelled signal having a reduced contribution from the at least one interferer.

10. The processing engine of claim 9, wherein the portion of the cancellation operator computed by the matrix converter comprises the form:

$$(U^T U)^{-1},$$

wherein U is the converted matrix and $U^T$ is a transpose of the converted matrix.

11. The processing engine of claim 10, wherein the cancellation operator comprises the form:

$$P_U^\perp = I - U(U^T U)^{-1} U^T,$$

wherein $P_U^\perp$ is the cancellation operator and I is an identity matrix.

12. The processing engine of claim 9, further comprising an applicator configured for applying the cancellation operator to an input signal to substantially cancel the at least one interferer.

13. The processing engine of claim 9, wherein the matrix converter comprises a comparator configured for selecting at least one vector having vector-derived values within the portion of the cancellation operator exceeding a threshold value, the comparator producing a plurality of selected vectors, wherein the matrix converter is further configured for generating the substantially orthogonal vector set from said plurality of vectors.

14. The processing engine of claim 9, wherein the substantially orthogonal vector set is generated according to the form:

$$\underline{u}_n = \underline{s}_n - \sum_{j=1}^{n-1} \underline{u}_j \left( \underline{u}_j^T \underline{u}_j \right)^{-1} \underline{u}_j^T \underline{s}_n,$$

wherein n is an integer greater than 1, s is a vector of the matrix and u is an orthogonalized vector of the converted matrix, and wherein the matrix is an interference matrix S.

15. The processing engine of claim 14, wherein the matrix generator comprises a storage unit configured for storing computed values of $u_j^T u_j$.

16. The processing engine of claim 14, wherein the computed values of $u_j^T u_j$ are used to generate values of the portion of the cancellation operator according to:

$$\sigma_j = (u_j^T u_j)^{-1},$$

wherein $\sigma_j$ is one of the values of the portion of cancellation operator and wherein the matrix generator comprises a storage unit configured for storing computed values of $\sigma_j$.

17. The processing engine of claim 16, wherein the values of $\sigma_j$ are compared to a threshold to determine use of the vectors $U_j$ in construction of the converted matrix.

18. The processing engine of claim 9, wherein the receiver is configurable with at least one of a base station and a handset.

19. A method for processing a received signal, comprising:
- providing for generating a plurality of vectors such that each of the plurality of vectors comprises elements from one or more interferers in the received signal;
- providing for generating a substantially orthogonal vector set from the plurality of vectors;
- providing for computing a portion of a cancellation operator in response to generating the substantially orthogonal vector set; and
- providing for using the portion of the cancellation operator to compute the cancellation operator, the cancellation operator configurable for operating on the received signal to produce an interference-cancelled signal having a reduced contribution from the one or more interferers.

20. The method of claim 19, further comprising providing for substantially canceling the one or more interferers using the cancellation operator.

21. The method of claim 20, wherein providing for substantially canceling comprises providing for applying the cancellation operator to an input signal to substantially cancel the one or more interferers comprised therewith.

22. The method of claim 19, wherein providing for computing comprises providing for computing the portion of the cancellation operator according to the form:

$$(U^T U)^{-1},$$

wherein U is a matrix comprising the substantially orthogonal vector set of said plurality of vectors and $U^T$ is a transpose of the matrix.

23. The method of claim 22, further comprising providing for computing the cancellation operator according to the form:

$$P_U^\perp = I - U(U^T U)^{-1} U^T,$$

wherein $P_U^\perp$ is the cancellation operator and I is an identity matrix.

24. The method of claim 19, further comprising providing for detecting vector-derived values exceeding a threshold value within the portion of the cancellation operator.

25. The method of claim 24, further comprising providing for selecting at least one of the plurality of vectors having vector-derived values that exceed the threshold value for producing a plurality of selected vectors, and providing for generating the substantially orthogonal vector set from said plurality of selected vectors.

26. The method of claim 19, wherein providing for generating the substantially orthogonal vector set comprises providing for generating a vector $u_n$ by removing components of a vector $s_n$ that lie in a direction of vectors $u_1, \ldots, u_{n-1}$, wherein n is an integer greater than 1.

27. The method of claim 26, wherein providing for generating the substantially orthogonal vector set comprises providing for generating the substantially orthogonal vector set according to the form:

$$u_n = s_n - \sum_{j=1}^{n-1} u_j (u_j^T u_j)^{-1} u_j^T s_n,$$

wherein s is a vector of the plurality of vectors and u is a vector of the substantially orthogonal vector set.

28. The method of claim 27, further comprising providing for storing computed values of $u_j^T u_j$.

29. The method of claim 27, further comprising:
providing for computing the values of σ wherein computed values of σ comprise the form $\sigma_j = (u_j^T u_j)^{-1}$, wherein $\sigma_j$ is one of the values of the portion of the cancellation operator; and
providing for storing the computed values of σ.

30. The method of claim 29, further comprising providing for comparing the values of $\sigma_j$ to a threshold value to determine use of the vectors $u_j$ in construction of the portion of the cancellation operator.

31. A system configured for processing a received signal comprising a signal of interest and at least one interferer, the system comprising:
means for generating a plurality of vectors such that each of the plurality of vectors comprises elements from the at least one interferer;
means for generating a substantially orthogonal vector set from the plurality of vectors;
means for generating a matrix from said substantially orthogonal vector set;
means for computing a portion of a cancellation operator in response to generating the substantially orthogonal vector set; and
means for using the portion of the cancellation operator to compute the cancellation operator, the cancellation operator configurable for operating on the received signal to produce an interference-cancelled signal having a reduced contribution from the at least one interferer.

32. The system of claim 31, further comprising means for substantially canceling the at least one interferer using the cancellation operator.

33. The system of claim 32, wherein the means for substantially canceling comprises means for applying the cancellation operator to an input signal to substantially cancel the at least one interferer comprised therewith.

34. The system of claim 31, wherein the means for computing comprises means for computing the portion of the cancellation operator according to the form:

$(U^T U)^{-1}$, wherein U is a matrix comprising the substantially orthogonal vector set and $U^T$ is a transpose of the matrix.

35. The system of claim 34, further comprising means for computing the cancellation operator according to the form:

$P_U^\perp = I - U(U^T U)^{-1} U^T$, wherein $P_U^\perp$ is the cancellation operator and I is an identity matrix.

36. The system of claim 31, further comprising means for detecting vector-derived values exceeding a threshold value while computing the portion of the cancellation operator.

37. The system of claim 36, further comprising means for selecting a plurality of the plurality of vectors having vector-derived values that exceed the threshold value for producing a plurality of selected vectors, and means for generating the substantially orthogonal vector set from said plurality of selected vectors.

38. The system of claim 37, wherein the vector-derived values comprise the form $\sigma_j = (u_j^T u_j)^{-1}$, wherein $\sigma_j$ is one of the values of the portion of the cancellation operator and wherein $u_j$ is one vector of the orthogonal vector set.

39. The system of claim 38, wherein the values of $\sigma_j$ are compared to the threshold value to determine use of the vectors $u_j$ in construction of the portion of the cancellation operator.

40. The system of claim 31, wherein the means for generating the substantially orthogonal vector set comprises means for generating a vector $u_n$ by removing components of a vector $s_n$ that lie in a direction of vectors $u_1, \ldots, u_{n-1}$, wherein n is an integer greater than 1.

41. The system of claim 40, wherein the means for generating the substantially orthogonal vector set comprises means for generating the substantially orthogonal vector set according to the form:

$$u_n = s_n - \sum_{j=1}^{n-1} u_j (u_j^T u_j)^{-1} u_j^T s_n,$$

wherein s is a vector of the plurality of vectors and u is a vector of the substantially orthogonal vector set.

42. The system of claim 41, further comprising means for storing computed values of $u_j^T u_j$.

43. The system of claim 41, further comprising means for storing computed values of $\sigma_j$, wherein $\sigma_j = (u_j^T u_j)^{31\ 1}$.

44. A system configured for processing a received signal comprising a signal of interest and at least one interfering signal, the system comprising:
a matrix having a substantially orthogonal vector set comprising a plurality of vectors, the substantially orthogonal vector set being generated according to the form:

$$u_n = s_n - \sum_{j=1}^{n-1} u_j (u_j^T u_j)^{-1} u_j^T s_n,$$

wherein n is an integer greater than 1, s is a vector of the matrix and u is an orthogonalized vector of the converted said matrix, wherein each vector of the substantially orthogonal vector set represents the at least one interfering signal; and
a directional filter configured for using the matrix to project a the received signal onto a subspace substantially orthogonal to the substantially orthogonal vector set for producing an interference-cancelled signal having a reduced contribution of the at least one interfering signal.

45. The system of claim 44, further comprising a matrix converter configured for computing a portion of a cancellation operator according to the form:

$(U^T U)^{-1}$, wherein U is the matrix and $U^T$ is a transpose of the matrix.

46. The system of claim 45, wherein the cancellation operator comprises the form:

$P_U^\perp = I - U(U^T U)^{-1} U^T$, wherein $P_U^\perp$ is the cancellation operator and I is an identity matrix.

47. The system of claim 44, wherein the matrix generator comprises a storage unit configured for storing computed values of $U_j^T u_j$.

48. The system of claim 44, wherein the computed values of $u_j^T u_j$ are used to generate values of the portion of the cancellation operator according to:

$$\sigma_j = (u_j^T u_j),$$

wherein $\sigma_j$ is one of the values of the portion of the cancellation operator and wherein the matrix generator comprises a storage unit configured for storing computed values of $\sigma_j$.

49. A method for cancelling at least one interfering signal in a received signal, comprising:
providing for generating a substantially orthogonal set of vectors according to the form:

$$u_n = s_n - \sum_{j=1}^{n-1} u_j (u_j^T u_j)^{-1} u_j^T s_n,$$

wherein n is an integer greater than 1, s is a vector of the substantially orthogonal matrix and u is an orthogonalized vector, wherein each vector of the substantially orthogonal set of vectors represents the at least one interfering signal;
providing for generating a substantially orthogonal matrix from the substantially orthogonal set of vectors;
providing for generating a cancellation operator from the substantially orthogonal matrix; and
providing for directionally filtering the interfering signals by projecting the received signal onto a subspace substantially orthogonal to the at least one interfering signal for producing an interference-cancelled signal having substantially no contribution of the at least one interfering in that subspace.

50. The method of claim 49, further comprising providing for computing a portion of a cancellation operator according to the form:

$$(U^T U)^{-1},$$

wherein U is the substantially orthogonal matrix and $U^T$ is a transpose of the substantially orthogonal matrix.

51. The method of claim 50, further comprising providing for computing the cancellation operator according to the form:

$$P_U^\perp = I - U(U^T U)^{-1} U^T,$$

wherein $P_U^\perp$ is the cancellation operator and I is an identity matrix.

52. The method of claim 49, further comprising providing for storing computed values of $u_j^T u_j$.

53. The method of claim 49, further comprising:
providing for generating values of the portion of the cancellation operator from $u_j^T u_j$ according to:

$$\sigma_j = (u_j^T u_j)^{-1},$$

wherein $\sigma_j$ is one of the values of the portion of the cancellation operator; and
providing for storing computed values of $\sigma_j$.

54. The method of claim 53, further comprising providing for comparing the values of $\sigma_j$ to a threshold to determine use of the vectors $u_j$ in construction of a converted matrix.

55. A receiver, comprising:
an antenna configured for receiving a radio signal, wherein the radio signal comprises a selected signal and one or more interfering signals;
an analog to digital converter configured for converting the radio signal to a digital signal;
a processing engine configured for substantially canceling said one or more interfering signals in the digital signal, the processing engine comprising
a matrix generator configured for generating a matrix having a plurality of vectors, wherein each of the plurality of vectors comprises elements from at least one of said one or more interfering signals,
a matrix converter communicatively coupled to the matrix generator, wherein the matrix converter is configured for generating a substantially orthogonal vector set from the plurality of vectors to convert the matrix to produce a converted matrix and for computing a portion of a cancellation operator from the converted matrix,
a processor configured for generating the cancellation operator from the converted matrix and the portion of the cancellation operator, and
an applicator configured for applying the cancellation operator to the digital signal to substantially cancel said one or more interfering signals and to generate an interference-canceled signal; and
receiver circuitry communicatively coupled to the processing engine and configured for the processing the interference-canceled signal.

56. The receiver of claim 55, further comprising a matrix converter configured for computing a portion of a cancellation operator according to the form:

$$(U^T U)^{-1},$$

wherein U is the matrix and $U^T$ is a transpose of the matrix.

57. The receiver of claim 45, wherein the cancellation operator comprises the form:

$$P_U^\perp = I - U(U^T U)^{-1} U^T,$$

wherein $P_U^\perp$ is the cancellation operator and I is an identity matrix.

58. The receiver of claim 55, wherein the substantially orthogonal vector set is generated according to the form:

$$u_n = s_n - \sum_{j=1}^{n-1} u_j (u_j^T u_j)^{-1} u_j^T s_n,$$

wherein n is an integer greater than 1, s is a vector of the matrix and u is an orthogonalized vector of the converted said matrix.

59. The receiver of claim 58, wherein the matrix generator comprises a storage unit configured for storing computed values of $u_j^T u_j$.

60. The receiver of claim 58, wherein the computed values of $u_j^T u_j$ are used to generate values of the portion of the cancellation operator according to:

$$\sigma_j = (u_j^T u_j),$$

wherein $\sigma_j$ is one of the values of the portion of the cancellation operator and wherein the matrix generator comprises a storage unit configured for storing computed values of $\sigma_j$.

61. A digital computer system programmed to perform the method of claim 19, 20, 21, 22, 23, 24, 25, 26, 27, 28, 29, 30, 49, 50, 51, or 54.

62. A computer-readable medium storing a computer program implementing the method of claim 19, 20, 21, 22, 23, 24, 25, 26, 27, 28, 29, 30, 49, 50, 51, or 54.

* * * * *